No. 745,669. PATENTED DEC. 1, 1903.
H. RICHTER.
MEANS FOR SUPPLYING WATER TO THE PISTONS OF GAS ENGINES.
APPLICATION FILED JULY 9, 1903.
NO MODEL.
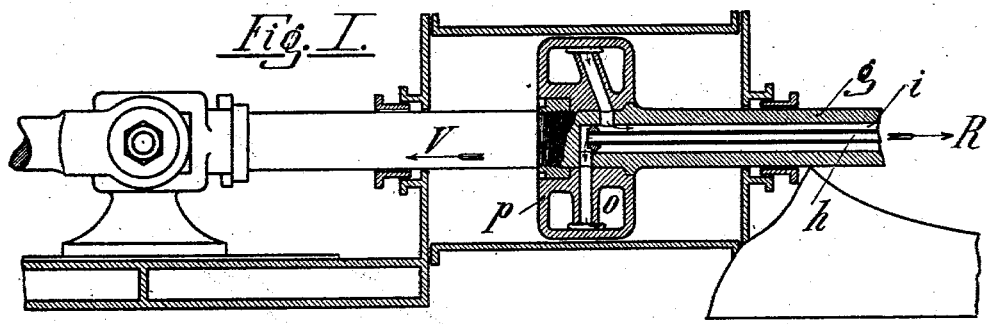
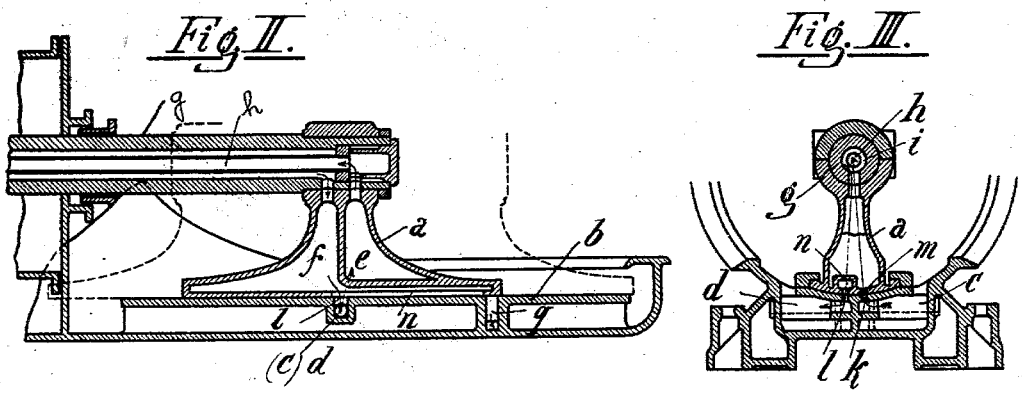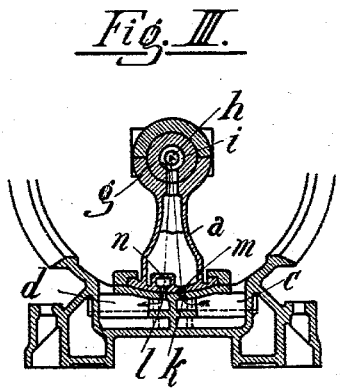
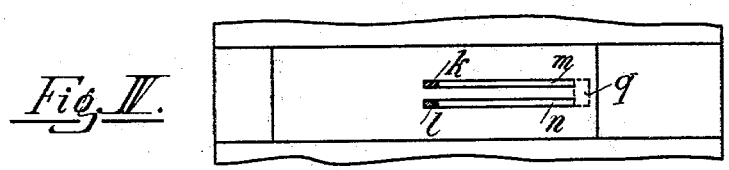
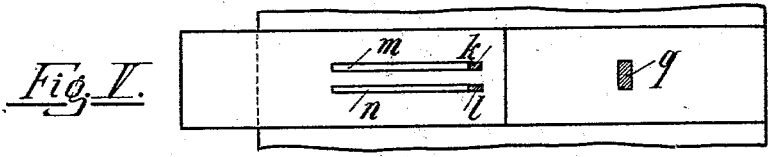
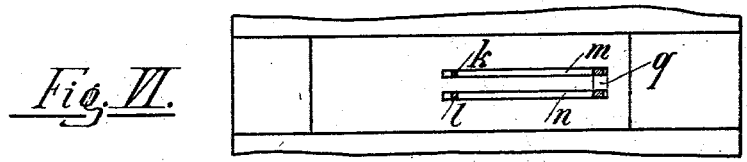
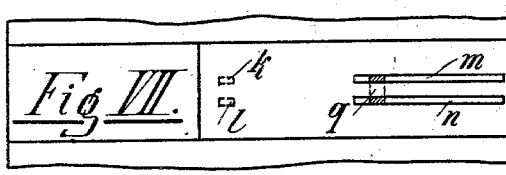
WITNESSES
H. M. Kuehne
A. W. White
INVENTOR
Hans Richter
BY
ATTORNEYS No. 745,669.                                                  Patented December 1, 1903.

UNITED STATES PATENT OFFICE.

HANS RICHTER, OF NUREMBERG, GERMANY.

MEANS FOR SUPPLYING WATER TO THE PISTONS OF GAS-ENGINES.

SPECIFICATION forming part of Letters Patent No. 745,669, dated December 1, 1903.

Application filed July 9, 1903. Serial No. 164,866. (No model.)

*To all whom it may concern:*

Be it known that I, HANS RICHTER, engineer, a subject of the German Emperor, residing at Nuremberg, in the Empire of Germany, (whose full postal address is Gleisbühlstrasse 15, Nuremberg aforesaid,) have invented certain new and useful Improvements in Means for Supplying Water to the Pistons of Gas-Engines, of which the following is a specification.

In gas-engines the piston of which have a water-cooling arrangement the supply and removal of the cooling-water frequently take place through the interior of a pipe inserted in the hollow piston-rod, as well as through an annular chamber between this inserted pipe and the inner face of the piston-rod, the inserted pipe and the annular chamber each communicating with a hollow part of the cross-head, (or of one cross-head where the engine has several.) In this arrangement acceleration and retardation pressures are experienced by the mass of water contained in the moving parts of the machine, which pressures are of a somewhat considerable amount at the ends of the stroke, but are almost *nil* in the center of each stroke and then change their direction. The water is thus during each two succeeding half-strokes, which take place before and after one dead-point of the engine, pressed toward the piston, which is not deleterious if the means for supplying and carrying off the water is slots on the slideface of the cross-head. In the next two halfstrokes, which take place before and after the other dead-points, the water is, however, accelerated or retarded in a reverse direction—that is to say, pressed toward the crosshead. Even if then the slots in the crosshead are in communication with the passages for supplying and carrying off the water arranged in the cross-head slideway the pump must permanently produce a similar or even greater pressure corresponding to the greatest acceleration produced in order that the water column in the interior of the pump-rod should not be broken and subsequently under the action of the opposite acceleration and the pressure of the outside air brought together again with great force. In order to avoid such water-hammers, by the present invention the connection of the water in the piston-rod and in the cross-head with the outer cooling-water pipe is interrupted during the period of the dangerous acceleration and retardation pressure, which action is attained by means of a peculiar arrangement of the slots on the under face of a cross-head and on the slideway of the same.

The whole arrangement of a gas-engine in which the water-supply to the piston-cooling chamber takes place in the improved manner is shown in Figure I of the accompanying drawings, while Figs. II and III show the details of the rear cross-head $a$, serving for the water-supply, and its slideway $b$, while Figs. IV, V, VI, and VII are diagrams showing the position of the slots of the cross-heads in various stages of the movement.

The slideway $b$ has two passages $c$ and $d$ for supplying and discharging the cooling-water, while the cross-head $a$ is provided with two chambers $e$ and $f$, one, $e$, of which is permanently in communication with the interior of a pipe $h$, inserted in a hollow piston-rod $g$, while the other, $f$, is permanently in communication with an annular chamber $i$ between this insertion-pipe $h$ and the inner face of the piston-rod $g$. The passages $c$ and $d$ for supplying and discharging the water end at the cross-head slide-plate in two short slots $k$ and $l$, arranged in proximity to each other, which slots correspond with larger longitudinal slots $m$ and $n$, arranged on the under face of the cross-head. So long as the slots $k$ and $l$ are kept open the water flows from the passage $c$ through the slots $k$ and $m$ into the hollow chamber $e$ of the cross-head $a$, thence into the inserted pipe $h$, then into the piston-cooling chamber $o$, then into the annular space $i$ between the piston-rod $g$ and the insertion-pipe $h$, and finally flows away through the hollow chamber $f$ of the cross-head $a$, the slots $l$ and $n$, and the passage $d$ of the slideway $b$.

From the middle of the forward stroke (the direction of which is indicated in the drawings by the arrow V) there is a retardation of the masses connected with the piston and during the first half of the return stroke (the direction of which is indicated in Fig. I by the arrow R) an acceleration of the masses rigidly connected with the piston takes place, and consequently the water is pressed in the direction toward the front wall $p$ of the piston. As this pressure is not deleterious, the water-inflow may take place in the manner hereinbefore described during the continuation of the two half-strokes in question. At the commencement of this period of water introduction in the middle of the forward stroke the slots $m$ and $n$ in the cross-head lie in the position shown in Fig. IV, in the front dead-point they lie in the position shown in Fig. V, and in the middle of the return stroke they again lie in the position shown in Fig. IV over the slots $k$ and $l$ in the slideway. It is thus seen that the water always has the same size of passage afforded it.

From the middle of the return stroke to the middle of the next forward stroke a retardation and an acceleration, respectively, of the masses rigidly connected with the piston takes place by the water being forced to the rear side of the cross-head $a$ and tending to emerge to the outside through the slots in the said cross-head. In order to avoid the danger resulting therefrom of a water-hammer in the piston, at the commencement of the second half of the return stroke, as shown in Fig. VI, the slots $k$ and $l$ will close the inlet and outlet passages $c$ and $d$ of the slideway, and to a similar extent a rectangular upper opening of a cross-passage $q$, also arranged in the slideway, is exposed. The water circulating inside the hollow chambers of the moved parts of the machine consequently continues its movement in such a way that the water discharged from the lower slot $n$ of the cross-head is conveyed through the cross-passage $q$ to the slot $m$ of the cross-head—that is to say, it remains in constant circulation. As thus passages of uniform size are available for the flow of the circulating water, as may be seen more particularly in Fig. VII, corresponding to the rear position of the cross-head, any shock is avoided.

Having now particularly described and ascertained the nature of the said invention and in what manner the same is to be performed, as communicated to me by my foreign correspondents, I declare that what I claim is—

1. In combination, with a piston of a gas-engine, a slideway, a cross-head moving thereon, a piston-rod connecting the cross-head and piston, said cross-head having chambers $e$ and $f$ therein and slots $m$ and $n$ through its wall, said slideway having passages $c$ and $d$ communicating with the said slots and having a cross-channel $q$ to place the chambers $e$ and $f$ in communication, substantially as described.

2. In combination, a piston a cross-head connected with the interior of the piston, said cross-head having the elongated slots $m$, $n$, and a slideway for the said cross-head having slots $k$ and $l$ and supply and discharge passages $c$ and $d$ connected with said slots and a cross-channel $q$, said slots $k$ and $l$ and the cross-channel $q$ being arranged to connect with slots $m$ and $n$ of the cross-head.

In witness whereof I have hereunto set my hand in presence of two witnesses.

HANS RICHTER.

Witnesses:
MARTIN OFFENBACHER,
OSCAR BOCK.